(12) United States Patent
Wu

(10) Patent No.: US 12,004,203 B2
(45) Date of Patent: Jun. 4, 2024

(54) RESOURCE ALLOCATION METHOD, RESOURCE USAGE METHOD, USER EQUIPMENT, AND NETWORK SIDE DEVICE

(71) Applicant: VIVO MOBILE COMMUNICATION CO., LTD., Guangdong (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 655 days.

(21) Appl. No.: 17/162,547

(22) Filed: Jan. 29, 2021

(65) Prior Publication Data

US 2021/0153211 A1  May 20, 2021

Related U.S. Application Data

(63) Continuation of application No. PCT/CN2019/097698, filed on Jul. 25, 2019.

(30) Foreign Application Priority Data

Aug. 1, 2018 (CN) .......................... 201810865266.0

(51) Int. Cl.
H04W 72/53 (2023.01)
H04L 1/1607 (2023.01)
H04L 1/1812 (2023.01)
H04W 72/0446 (2023.01)
H04W 72/23 (2023.01)

(52) U.S. Cl.
CPC ........... *H04W 72/53* (2023.01); *H04L 1/1614* (2013.01); *H04L 1/1819* (2013.01); *H04W 72/0446* (2013.01); *H04W 72/23* (2023.01)

(58) Field of Classification Search
None
See application file for complete search history.

(56) References Cited

U.S. PATENT DOCUMENTS 10,834,778 B2 * 11/2020 Pan ..................... H04L 5/0098
11,647,462 B2 *  5/2023 Lin .................. H04W 52/0274
                                                     370/311
11,722,215 B1 *  8/2023 Bhaskar ............... H04L 1/0003
                                                     370/316

(Continued)

FOREIGN PATENT DOCUMENTS

CN       102104973 A     6/2011
CN       106211332 A    12/2016

(Continued)

OTHER PUBLICATIONS

Supplementary European Search Report for Application No. 19843448.2-1215 / 3829240—PCT/CN2019/097698, dated Oct. 21, 2021.

(Continued)

*Primary Examiner* — Otis L Thompson, Jr.
(74) *Attorney, Agent, or Firm* — Harness, Dickey & Pierce, P.L.C.

(57) ABSTRACT

A resource allocation method includes: sending configuration information of resources to a user equipment. The configuration information of the resources includes at least one of the following: a periodicity of the resources, or allocation information of a plurality of resources within each periodicity.

18 Claims, 4 Drawing Sheets

Configuration information of resources is sent to a user equipment, wherein the configuration information of resources includes at least one of the following: a periodicity of the resources or allocation information of a plurality of resources within each periodicity — 101

(56) References Cited

U.S. PATENT DOCUMENTS

| | | |
|---|---|---|
| 2013/0201971 A1 | 8/2013 | Chen et al. |
| 2016/0095108 A1* | 3/2016 | Ryoo .................... H04L 5/0032 370/329 |
| 2017/0019887 A1* | 1/2017 | Jiang .................... H04W 72/23 |
| 2017/0071010 A1 | 3/2017 | Lim et al. |
| 2018/0160418 A1 | 6/2018 | Luo et al. |
| 2018/0176945 A1* | 6/2018 | Cao ........................ H04L 5/0044 |
| 2019/0007176 A1* | 1/2019 | Ozturk .................. H04L 1/1816 |
| 2019/0053211 A1* | 2/2019 | Ying .................. H04W 72/044 |
| 2019/0166616 A1 | 5/2019 | Liu et al. |
| 2019/0166621 A1* | 5/2019 | Yerramalli ............ H04L 5/0082 |
| 2019/0191416 A1 | 6/2019 | Xie et al. |
| 2019/0215900 A1* | 7/2019 | Pan ...................... H04W 72/23 |
| 2019/0297636 A1* | 9/2019 | Gupta ............... H04W 72/1273 |
| 2020/0029340 A1* | 1/2020 | He ...................... H04W 76/14 |
| 2023/0276505 A1* | 8/2023 | Jeon .................. H04W 74/0833 370/332 |

FOREIGN PATENT DOCUMENTS

| | | |
|---|---|---|
| CN | 106465391 A | 2/2017 |
| CN | 108307502 A | 7/2018 |

OTHER PUBLICATIONS

"BWP selection based on HARQ process ID in NR-U," LG Electronics Inc., 3GPP TSG-RAN WG2 Ad hoc 1807, R2-1810597, dated Jul. 6, 2018.

"Remaining issues with AUL activation and deactivation," Huawei, HiSilicon, 3GPP TSG-RAN2 Meeting #101bis, R2-1805804, dated Apr. 20, 2018.

"SUL and AUL coexistence," Intel Corporation, 3GPP TSG-RAN WG2 Meeting #101bis, R2-1804895, dated Apr. 20, 2018.

International Search Report and Written Opinion of the International Searching Authority regarding International Patent Application No. PCT/CN2019/097698, dated Oct. 29, 2019. Translation provided by Bohui Intellectual Property.

* cited by examiner

Configuration information of resources is sent to a user equipment, wherein the configuration information of resources includes at least one of the following: a periodicity of the resources or allocation information of a plurality of resources within each periodicity ⸺101

FIG. 1

Configuration information of resources from a network side device is received, wherein the configuration information of the resources includes at least one of the following: a periodicity of the resources, or allocation information of a plurality of resources within each periodicity ⸺201

An activation signaling from the network side device is received, and available resources are determined according to position information of resources in the activation signaling and the configuration information of the resources ⸺202

FIG. 2

RESOURCE ALLOCATION METHOD, RESOURCE USAGE METHOD, USER EQUIPMENT, AND NETWORK SIDE DEVICE

CROSS-REFERENCE TO RELATED APPLICATION

This application is a Bypass Continuation Application of PCT/CN2019/097698 filed on Jul. 25, 2019, which claims priority to Chinese Patent Application No. 201810865266.0, filed on Aug. 1, 2018, which are incorporated herein by reference in their entirety.

TECHNICAL FIELD

The present disclosure relates to the field of communication technologies, and in particular, to a resource allocation method, a resource usage method, a user equipment, and a network side device.

BACKGROUND

For an unlicensed band, a sending terminal needs to monitor whether the band is occupied before sending a signal, and if the band is not occupied, the sending terminal may send the signal.

SUMMARY

In a first aspect, the embodiments of the present disclosure provide a resource allocation method applied to a network side device. The resource allocation method includes:

sending configuration information of resources to a user equipment, wherein the configuration information of the resources includes at least one of the following: a periodicity of the resources, or allocation information of a plurality of resources within each periodicity.

In a second aspect, the embodiments of the present disclosure provide a resource usage method applied to a user equipment. The resource usage method includes:

receiving configuration information of resources from a network side device, wherein the configuration information of the resources includes at least one of the following: a periodicity of the resources, or allocation information of a plurality of resources within each periodicity; and receiving an activation signaling from the network side device, and determining available resources according to position information of resources in the activation signaling and the configuration information of the resources.

In a third aspect, the embodiments of the present disclosure provide a network side device. The network side device includes a memory, a processor, and a computer program stored in the memory and executed on the processor. The computer program, when executed by the processor, implements steps in the resource allocation method as described above.

In a fourth aspect, the embodiments of the present disclosure provide a user equipment. The user equipment includes a memory, a processor, and a computer program stored in the memory and executed on the processor. The computer program, when executed by the processor, implements steps in the resource usage method as described above.

BRIEF DESCRIPTION OF THE DRAWINGS

FIG. 1 is a schematic diagram showing a process of a resource allocation method, in accordance with some embodiments of the present disclosure;

FIG. 2 is a schematic diagram showing a process of a resource usage method, in accordance with some embodiments of the present disclosure;

DETAILED DESCRIPTION

Figure 3:
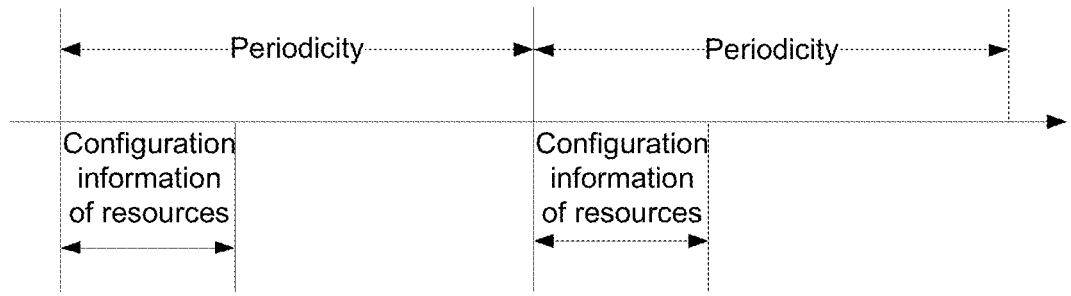
FIG. 3 is a schematic diagram of a network side device sending configuration information of resources to a user equipment, in accordance with some embodiments of the present disclosure.

To make the technical problem to be solved, technical solutions and advantages of the embodiments of the present disclosure clearer, description will be made in detail below with reference to the accompanying drawings and specific embodiments.

At present, in a 5G system, a network side device may configure a user equipment (UE) with a semi-persistent data transmission resource, which includes the following several manners: downlink semi-persistent scheduling (DL SPS), uplink (UL) configured grant Type 1, UL configured grant Type 2, and autonomous uplink (AUL).

In the DL SPS, the network side device configures periodicity downlink resources, and one downlink resource is allocated within each periodicity. The network side device activates or deactivates the use of the SPS resource through a physical downlink control channel (PDCCH) control signaling, and a starting position of the resource is the position (e.g., SFNstart time (starting system frame number) and slotstart time (starting slot number)) of the resource to be activated indicated by the PDCCH control signaling. The UE calculates the position of the N-th resource through the following formula:

(numberOfSlotsPerFrame×SFN+slot number in the frame)=[(numberOfSlotsPerFrame×SFNstart time+slotstart time)+$N$×periodicity×numberOfSlotsPerFrame/10]modulo(1024×numberOfSlotsPerFrame).

In the DL SPS, hybrid automatic repeat request process (HARQ process) identifier(s) in a specific slot is calculated through the following formula:

HARQ Process ID=[floor(CURRENT_slot×10/(numberOfSlotsPerFrame×periodicity))]modulo nrof-HARQ-Processes, where numberOfSlotsPerFrame is a number of slots per frame, CURRENT_slot is a current slot number, wherein CURRENT_slot=[(SFN×numberOfSlotsPerFrame)+slot number in the frame], slot number in the frame is a slot number in the current system frame, SFN is a current system frame number, numberOfSlotsPerFrame is a number of slots per system frame, periodicity is an SPS resource periodicity configured by a radio resource control (RRC) message, and nrof-HARQ-Processes is a number of the HARQ processes of the SPS resource configured by the RRC message.

In the UL configured grant Type 1, periodic uplink resources are configured by the network side device, and one uplink resource is allocated within each periodicity. It is unnecessary to activate the uplink resource through the PDCCH command, and the uplink resource may be used after being configured by RRC. The UE calculates the position of the N-th resource through the following formula:

[(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity)modulo (1024×numberOfSlotsPerFrame×numberOfSymbolsPerSlot), where numberOfSymbolsPerSlot is a number of symbols (i.e., orthogonal frequency division multiplexing (OFDM) symbols) per slot, the timeDomainOffset is a resource offset (e.g., slot 1) relative to a time domain with SFN equalling to 0 (SFN=0), N is a resource number, and S is a starting symbol number (e.g., for the position of slot 1, the starting symbol is OFDM symbol 1.).

In the UL configured grant Type 1, a HARQ process ID in a specific slot is calculated through the following formula:

HARQ Process ID=[floor(CURRENT_symbol/periodicity)]modulo nrofHARQ-Processes, where the CURRENT_symbol is a current symbol number, and CURRENT_symbol=(SFN×numberOfSlotsPerFrame×numberOfSymbolsPerSlot+slot number in the frame×numberOfSymbolsPerSlot+symbol number in the slot (a symbol number of the current slots)).

The numberOfSymbolsPerSlot is a number of symbols per slot.

In the UL configured grant Type 2, periodic uplink resources are configured by the network side device, and one uplink resource is allocated within each periodicity. The network side device activates or deactivates the use of the SPS resource through a PDCCH control signaling, and a starting position of the resource is the position (e.g., SFN-start time (starting system frame number) and slotstart time (starting slot number)) of the resource to be activated indicated by a PDCCH command. The UE calculates the position of the N-th resource through the following formula:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity]modulo (1024×numberOfSlotsPerFrame×numberOfSymbolsPerSlot).

In the UL configured grant Type 2, a HARQ process ID of a specific slot is calculated through the following formula:

HARQ Process ID=[floor(CURRENT_symbol/periodicity)]modulo nrofHARQ-Processes, where The CURRENT_symbol is the current symbol number, CURRENT_symbol=(SFN×numberOfSlotsPerFrame×numberOfSymbolsPerSlot+slot number in the frame×numberOfSymbolsPerSlot+symbol number in the slot (a symbol number of the current slots).

The numberOfSymbolsPerSlot is a number of symbols per slot.

In the AUL, the network side device configure resource allocation of a bitmap (for example, if a value of one bit in 40 bits is set to be 1, the resource is allocated to the UE). The network side device activates or deactivates the use of the AUL resource through a PDCCH control signaling, and a starting position of the resource is the position (e.g., SFN-start time (a starting system frame number), slotstart time (a starting slot number) and symbolstart time (a starting symbol number)) of a resource to be activated indicated by a PDCCH command. When the UE has uplink data to send, the UE autonomously selects one HARQ process from a HARQ process pool configured by the network side device to send the uplink data.

At present, only a very limited number of transmission resources (e.g., transmission resources in one time domain) can be configured within a semi-persistent transmission periodicity of the UE. Therefore, when the transmission resources cannot be transmitted because channels are being occupied, the UE cannot use the semi-persistent resources until the next periodicity, which results in a time delay of data transmission. For the AUL configuration, if a bitmap is used to configure the resources, for a service with a long periodicity (e.g., a periodicity of 640 ms), at least 640 bits are required to allocate the resource positions, which therefore causes a large amount of signaling loss.

In order to solve the above problem, embodiments of the present disclosure provide a resource allocation method, a resource usage method, a user equipment, and a network side device, which can reduce the time delay of data transmission.

The embodiments of the present disclosure provide a resource allocation method applied to a network side device. As shown in FIG. 1, the resource allocation method includes:

step 101, configuration information of resources being sent to a user equipment, wherein the configuration information of the resources includes at least one of the following: a periodicity of the resources, or allocation information of a plurality of resources within each periodicity.

In the present embodiment, the network side device sends configuration information of the plurality of resources within each periodicity to the user equipment, so that the network side device and/or the user equipment may obtain allocation information of the plurality of resources within each sending periodicity, and further send data according to the allocation information of the plurality of resources. In this way, the time delay of the data transmission is reduced.

Further, the configuration information of the resources further includes HARQ configuration information of the resources.

Further, the configuration information of the resources is configuration information of DL SPS resources, or configuration information of UL configured grant Type 2 resources, or configuration information of AUL resources.

Further, the configuration information of the resources is configuration information of UL configured grant Type 1 resources, and the configuration information of the resources further includes at least one of the following:
a time domain offset, or
a time domain length occupied by each time domain resource.

Further, the allocation information of the plurality of resources within each periodicity includes at least one of the following:
starting position information of resource allocation;
a resource allocation bitmap indicating corresponding available resource, starting from a starting position of the resources in n bits, wherein n is a positive integer;
a resource allocation duration indicating a duration of the existence of available resources starting from the starting position of the resources; or a resource allocation short periodicity indicating a periodicity of each available resource in a second predetermined time starting from the starting position.

Further, the HARQ configuration information of the resources includes at least one of the following:
- a number of HARQ processes of the resources;
- HARQ process identifier(s) of the resources;
- a number of HARQ processes that are available to the resources within each periodicity; or
- HARQ process identifier(s) available to the resources within each periodicity;

Further, in a case where the configuration information of the resources is the configuration information of the DL SPS resources, the method further includes:
- detecting whether a resource is available at sending positions for the plurality of resources within each periodicity; and if the resource is available, sending data at the sending position of the available resource.

The embodiments of the present disclosure further provide a resource usage method applied to a user equipment. As shown in FIG. 2, the resource usage method includes steps 201 to 202.

In step 201, configuration information of resources from a network side device is received, and the configuration information of the resources includes at least one of the following: a periodicity of the resources, or allocation information of a plurality of resources within each periodicity.

In step 202, an activation signaling from the network side device is received, and available resources are determined according to position information of resources in the activation signaling and the configuration information of the resources.

In the present embodiment, the network side device sends configuration information of the plurality of resources within each periodicity to the user equipment, so that the network side device and/or the user equipment may obtain allocation information of the plurality of resources within each sending periodicity, and further send data according to the allocation information of the plurality of resources. In this way, the time delay of the data transmission is reduced.

Further, in a case where the configuration information of the resources further includes HARQ configuration information of the resources, the resource usage method further includes:
- calculating available HARQ process identifier(s) within each periodicity according to the configuration information of the resources.

Further, the configuration information of the resources is configuration information of DL SPS resources, or configuration information of UL configured grant Type 2 resources, or configuration information of AUL resources.

Further, the configuration information of the resources is configuration information of UL configured grant Type 1 resources, and the configuration information of the resources further includes at least one of the following:
- a time domain offset,
- or a time domain length occupied by each time domain resource.

Further, the allocation information of the plurality of resources within each periodicity includes at least one of the following:
- starting position information of resource allocation;
- a resource allocation bitmap indicating corresponding available resource, starting from a starting position of the resources in n bits, wherein n is a positive integer;
- a resource allocation duration indicating a duration of the existence of available resources starting from the starting position of the resources; or
- a resource allocation short periodicity indicating a periodicity of each available resource in a second predetermined time starting from the starting position.

Further, the HARQ configuration information of the resources includes at least one of the following:
- a number of HARQ processes of the resources;
- HARQ process identifiers of the resources;
- a number of HARQ processes that are available to the resources within each periodicity; or
- HARQ process identifiers that are available to the resources within each periodicity;

Further, the configuration information of the resources is the configuration information of the DL SPS resources, or the configuration information of the UL configured grant Type 1 resources, or the configuration information of the UL configured grant Type 2 resources. In a case where the number of available HARQ processes within each periodicity is multiple, calculating available HARQ process identifier(s) within each periodicity according to the configuration information of the resources includes:
- assigning identifier(s) to the HARQ processes of the resources within each periodicity according to a periodicity number sequence and a resource number sequence within each periodicity.

Further, the configuration information of the resources is the configuration information of the UL configured grant Type 1 resources, or the configuration information of the UL configured grant Type 2 resources, or the configuration information of the AUL resources. The method further includes:
- detecting whether a resource is available at sending positions for the plurality of resources within each periodicity; and if the resources is available, sending data at the sending position of the available resource.

The technical solutions of the present disclosure will be further described below with reference to specific embodiments.

In some embodiments of the present disclosure, as shown in FIG. 3, a network side device sends configuration information of resources to a user equipment (UE) according to a preset periodicity, wherein the configuration information of the resources is configuration information of DL SPS resources, and a HARQ process is available within each periodicity. The present embodiment includes the following steps.

In step 1, the network side device sends the configuration information of the DL SPS resources to the UE, and the configuration information of the resources includes one of the following or any combination of the following:
- a periodicity of resources (e.g., 40 ms),
- and allocation information of a plurality of resources within each periodicity;
- wherein the allocation information of the plurality of resources within each periodicity includes one of the following or any combination of the following:
- starting position information of resource allocation (e.g., slot 2, or an offset to an activated position being 2 slots);
- a resource allocation bitmap (e.g., ten bits identify positions of ten slots, and for a bit with a value being 1, a resource at the position of the slot is considered as a resource allocated to the UE.);

a resource allocation duration (e.g., for a resource with a periodicity of 40 ms, it is a resource allocation duration of 10 ms from a starting position of the resource.);

and a resource allocation short periodicity (e.g., for a resource with a periodicity of 40 ms, there is a resource allocation duration of 10 ms in every 40 ms, and a periodicity of resource allocation in the 10 ms is 2 ms.).

Further, the network side device may further send available HARQ configuration information to the UE, or agree on HARQ configuration information available to the UE in advance through a protocol. The HARQ configuration information may include:

a number of HARQ processes of the resources (e.g., the total number of HARQ processes that are available to the resources is four.).

In step 2.1, according to the configuration information of the resources received in the step 1, when the network side device sends an activation signaling (e.g., a PDCCH activation command), the UE calculates the position information of resources available to itself according to position information of resources in the activation signaling, and uses the resources at the position;

wherein the position of the first available resource of the UE within each periodicity may be calculated through the following formula:

(numberOfSlotsPerFrame×SFN+slot number in the frame)=[(numberOfSlotsPerFrame×SFNstart time+slotstart time)+$N$×periodicity×numberOfSlotsPerFrame/10]modulo(1024×numberOfSlotsPerFrame).

The numberOfSlotsPerFrame is a number of slots per frame, the SFN is a current system frame number, the slot number in the frame is a slot number in the current system frame, the SFNstart time is a starting system frame number, the slotstart time is a starting slot number, and the periodicity is an SPS resource periodicity configured by an RRC message.

The information of the resources (including the starting position of the resources) available to the UE within each periodicity may be configured through at least one of the following manners.

In manner 1, the configuration is made through the resource allocation bitmap, for example, a 10-bit bitmap is used to indicate the position of available resource in 10 bits starting from the starting position.

In manner 2, the configuration is made through the resource allocation duration, for example, a resource allocation duration of 10 ms is used to indicate the resource of 10 ms starting from the starting position.

In manner 3, the configuration is made through the resource allocation duration and the resource allocation short periodicity, for example, the resource allocation duration of 10 ms and the resource allocation short periodicity of 2 ms are used to indicate that one resource is allocated every 2 ms in a 10-ms time starting from the starting position.

In step 2.2, the UE calculates the available HARQ process identifier within each periodicity according to the configuration information of the resources received in the step 1. In the present embodiment, the number of the available HARQ process within each periodicity is one.

For example, the available HARQ process identifier (HARQ process ID) may be calculated through the following formula:

HARQ Process ID=[floor(CURRENT_slot×10/(numberOfSlotsPerFrame×periodicity))]modulo nrofHARQ-Processes, where the CURRENT_slot is a current slot number, the numberOfSlotsPerFrame is a number of slots per frame, the periodicity is an SPS resource periodicity configured by the RRC message, and the nrofHARQ-Processes is a number of HARQ processes of the SPS resource configured by the RRC message.

In step 2.3, the network side device detects whether a resource is available at sending positions for the plurality of resources within each periodicity; and if the resource is available, the network side device sends data at the sending position of the available resource.

In some embodiments of the present disclosure, as shown in FIG. 3, the network side device sends configuration information of resources to the user equipment according to a preset periodicity, wherein the configuration information of the resources is configuration information of the DL SPS resources, and a plurality of HARQ processes are available within each periodicity. The present embodiment includes the following steps.

In step 1, the network side device sends the configuration information of the DL SPS resources to the UE, and the configuration information of the resources includes one of the following or any combination of the following:

the number of HARQ processes of the resources (e.g., the total number of HARQ processes that are available to the resources is four.);

a periodicity of resources (e.g., 40 ms);

and allocation information of a plurality of resources within each periodicity;

wherein the allocation information of the plurality of resources within each periodicity includes one of the following or any combination of the following:

starting position information of resource allocation (e.g., slot 2, or an offset to an activated position being 2 slots);

a resource allocation bitmap (e.g., ten bits identify positions of ten slots, and for a bit with a value being 1, a resource at the position of the slot is considered as a resource allocated to the UE.);

a resource allocation duration (e.g., for a resource with a periodicity of 40 ms, it is a resource allocation duration of 10 ms from a starting position of the resource.);

and a resource allocation short periodicity (e.g., for a resource with a periodicity of 40 ms, there is a resource allocation duration of 10 ms in every 40 ms, and a periodicity of resource allocation in the 10 ms is 2 ms.).

Further, the network side device may further send available HARQ configuration information to the UE, or agree on HARQ configuration information available to the UE in advance through a protocol. The HARQ configuration information may include one of the following or any combination of the following:

the number of HARQ processes of the resources (e.g., the total number of HARQ processes that are available to the resources is four.);

the HARQ process identifiers of the resources (e.g., the HARQ process identifiers available to the resources are 1, 2, 3, and 4.);

the number of HARQ processes available to the resources within each periodicity (e.g., nrofHARQ-ProcessesPerPeriod, and two HARQ processes may be available within each periodicity.); or the HARQ process identifiers available to the resources within each periodicity (e.g., there are four HARQ processes available to the UE in total, and two HARQ processes are available within each periodicity, then the HARQ process identifiers of the UE in the first periodicity starting from a starting activated position are 1 and 2; the HARQ process identifiers in the second periodicity are 3 and 4; the HARQ process identifiers in the third periodicity are 1 and 2; and the HARQ process identifiers in the fourth periodicity are 3 and 4, and so on.).

In step 2.1, according to the configuration information of the resources received in the step 1, when the network side device sends an activation signaling (e.g., a PDCCH activation command), the UE calculates the position information of resources available to itself according to the position information of resources in the activation signaling, and uses the resources at the position;

wherein the position of the first available resource of the UE within each periodicity may be calculated through the following formula:

(numberOfSlotsPerFrame×SFN+slot number in the frame)=[(numberOfSlotsPerFrame×SFNstart time+slotstart time)+N×periodicity×numberOfSlotsPerFrame/10]modulo(1024×numberOfSlotsPerFrame), where the numberOfSlotsPerFrame is a number of slots per frame, the SFN is a current system frame number, the slot number in the frame is a slot number in the current system frame, the SFNstart time is a starting system frame number, the slotstart time is a starting slot number, and the periodicity is an SPS resource periodicity configured by an RRC message.

The information of the resources (including the starting position of the resources) available to the UE within each periodicity may be configured through at least one of the following manners.

In manner 1, the configuration is made through the resource allocation bitmap, for example, a 10-bit bitmap is used to indicate the position of available resources in 10 bits starting from the starting position.

In manner 2, the configuration is made through the resource allocation duration, for example, a resource allocation duration of 10 ms is used to indicate the resource of 10 ms starting from the starting position.

In manner 3, the configuration is made through the resource allocation duration and the resource allocation short periodicity, for example, the resource allocation duration of 10 ms and the resource allocation short periodicity of 2 ms are used to indicate that one resource is allocated every 2 ms in a 10-ms time starting from the starting position.

In step 2.2, the UE calculates available HARQ process identifiers within each periodicity according to the configuration information of the resources received in the step 1. In the present embodiment, the number of the available HARQ processes within each periodicity is multiple.

For example, the UE may calculate the HARQ process identifier (HARQ process ID) of the first resource within each periodicity through the following formula:

HARQ Process ID=[floor(CURRENT_slot×10/(numberOfSlotsPerFrame×periodicity))]modulo(nrofHARQ-Processes/nrofHARQ-ProcessesPerPeriod), where the CURRENT_slot is a current slot number, the numberOfSlotsPerFrame is a number of slots per frame, the periodicity is the SPS resource periodicity configured by the RRC message, the nrofHARQ-Processes is the number of HARQ processes of the SPS resource configured by the RRC message, and the nrofHARQ-ProcesssesPerPeriod is a number of HARQ processes that are available to the resources within each periodicity.

The HARQ process identifiers of subsequent resources of the UE within each periodicity are:

assigned in sequence within the remaining HARQ process IDs according to a periodicity number sequence and a resource number sequence. For example, the periodicity is equal to 10, the nrofHARQ-Processes is equal to 4, the nrofHARQ-ProcesssesPerPeriod is equal to 2, and if the network side device configures two resource positions per periodicity, then the HARQ process ID of the first resource in the first periodicity equals to 1, the HARQ process ID of the first resource in the second periodicity equals to 2, the HARQ process ID of the first resource in the third periodicity equals to 1, and the HARQ process ID of the first resource in the fourth periodicity equals to 2, and so on; the HARQ process ID of the second resource in the first periodicity equals to 3, the HARQ process ID of the second resource in the second periodicity equals to 4; the HARQ process ID of the second resource in the third periodicity equals to 3, and the HARQ process ID of the second resource in the fourth periodicity equals to 2, and so on.

In step 2.3, the network side device detects whether a resource is available at sending positions for the plurality of resources within each periodicity; and if the resource is available, the network side device sends data at the sending position of the available resource.

In some embodiments of the present disclosure, as shown in FIG. 3, the network side device sends configuration information of resources to the user equipment according to a preset periodicity, wherein the configuration information of the resources is configuration information of the UL configured grant Type 1 resources, and a HARQ process is available within each periodicity. The present embodiment includes the following steps.

In step 1, the network side device sends the configuration information of the UL configured grant Type 1 resources to the UE, and the configuration information of the resources includes one of the following or any combination of the following:

a periodicity of resources (e.g., periodicity, 40 ms);
a time domain offset (e.g., timeDomainOffset, and for a position with SFN equalling to 0, a time domain position of the resource being a position of a tenth symbol (i.e., OFDM symbol));
a time domain length occupied by each time domain resource (e.g., timeDomainAllocation, and each time domain resource occupying two symbols);
and allocation information of a plurality of resources within each periodicity;

wherein the allocation information of the plurality of resources within each periodicity includes one of the following or any combination the following:

a resource allocation bitmap (e.g., ten bits identify positions of ten slots, and for a bit with a value being 1, a resource at the position of the slot is considered as a resource allocated to the UE.);
a resource allocation duration (e.g., for a resource with a periodicity of 40 ms, it is a resource allocation duration of 10 ms from a starting position of the resource.);
and a resource allocation short periodicity (e.g., for a resource with a periodicity of 40 ms, there is a resource allocation duration of 10 ms in every 40 ms, and a periodicity of resource allocation in the 10 ms is 2 ms.).

Further, the network side device may further send available HARQ configuration information to the UE, or agree on HARQ configuration information available to the UE in advance through a protocol. The HARQ configuration information may include:

a number of HARQ processes of the resources (e.g., the total number of HARQ processes that are available to the resources being four).

In step 2.1, the UE calculates position information of resources available to itself according to the configuration information of the resources received in the step 1, and uses resources at the position.

The position of the first available resource of the UE within each periodicity may be calculated through the following formula:

[(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity)modulo (1024×numberOfSlotsPerFrame×numberOfSymbolsPerSlot), where the numberOfSlotsPerFrame is a number of slots per frame, the numberOfSymbolsPerSlot is a number of symbols per slot, the SFN is a current system frame number, the slot number in the frame is a slot number in the current system frame, the timeDomainOffset is a resource offset relative to a time domain with SFN equalling to 0, S is a starting symbol number, $N$ is a resource number, and the periodicity is the SPS resource periodicity configured by the RRC message.

The information of the resources (including the starting position of the resources) available to the UE within each periodicity may be configured through at least one of the following manners.

In manner 1, the configuration is made through the resource allocation bitmap, for example, a 10-bit bitmap is used to indicate the position of available resources in 10 bits starting from the starting position.

In manner 2, the configuration is made through the resource allocation duration, for example, a resource allocation duration of 10 ms is used to indicate the resource of 10 ms starting from the starting position.

In manner 3, the configuration is made through the resource allocation duration and the resource allocation short periodicity, for example, the resource allocation duration of 10 ms and the resource allocation short periodicity of 2 ms are used to indicate that one resource is allocated every 2 ms in a 10-ms time starting from the starting position.

In step 2.2, the UE calculates the available HARQ process identifier within each periodicity according to the configuration information of the resources received in the step 1. In the present embodiment, the number of the available HARQ process within each periodicity is one.

For example, the available HARQ process identifier (HARQ process ID) may be calculated through the following formula:

HARQ Process ID=[floor(CURRENT_slot×10/(numberOfSlotsPerFrame×periodicity))]modulo nrofHARQ-Processes, where the CURRENT_slot is a current slot number, the numberOfSlotsPerFrame is a number of slots per frame, the periodicity is the SPS resource periodicity configured by the RRC message, and the nrofHARQ-Processes is a number of HARQ processes of the SPS resource configured by the RRC message.

In step 2.3, the UE detects whether a resource is available at sending positions for the plurality of resources within each periodicity; and if the resource is available, the UE sends data at the sending position of the available resource.

In some embodiments of the present disclosure, as shown in FIG. 3, the network side device sends configuration information of resources to the user equipment according to a preset periodicity, wherein the configuration information of the resources is configuration information of the UL configured grant Type 1 resources, and a plurality of HARQ processes are available within each periodicity. The present embodiment includes the following steps.

In step 1, the network side device sends the configuration information of the UL configured grant Type 1 resources to the UE, and the configuration information of the resources includes one of the following or any combination of the following:

a periodicity of resources (e.g., periodicity, 40 ms);

a time domain offset (e.g., timeDomainOffset, and for a position with SFN equalling to 0 (SFN=0), a time domain position of the resource being a position of a tenth symbol (i.e., OFDM symbol));

a time domain length occupied by each time domain resource (e.g., timeDomainAllocation, and each time domain resource occupying two symbols);

and allocation information of a plurality of resources within each periodicity;

wherein the allocation information of the plurality of resources within each periodicity includes one of the following or any combination of the following:

a resource allocation bitmap (e.g., ten bits identify positions of ten slots, and for a bit with a value being 1, a resource at the position of the slot is considered as a resource allocated to the UE.);

a resource allocation duration (e.g., for a resource with a periodicity of 40 ms, it is a resource allocation duration of 10 ms from a starting position of the resource.);

and a resource allocation short periodicity (e.g., for a resource with a periodicity of 40 ms, there is a resource allocation duration of 10 ms in every 40 ms, and a periodicity of resource allocation in the 10 ms is 2 ms.).

Further, the network side device may further send available HARQ configuration information to the UE, or agree on HARQ configuration information available to the UE in advance through a protocol. The HARQ configuration information may include one of the following or any combination of the following:

a number of HARQ processes of the resources (e.g., the total number of HARQ processes that are available to the resources is four.);

HARQ process identifiers of resources (e.g., the HARQ process identifiers available to the resources in total are 1, 2, 3, and 4.);

a number of HARQ processes available to the resources within each periodicity (e.g., nrofHARQ-ProcessesPerPeriod, and two HARQ processes may be available within each periodicity.); or the HARQ process identifiers available to the resources within each periodicity (e.g., there are four HARQ processes available to the UE in total, and two HARQ processes are available within each periodicity, then the HARQ process identifiers of the UE in the first periodicity starting from a starting activated position are 1 and 2; the HARQ process identifiers in the second periodicity are 3 and 4; the HARQ process identifiers in the third periodicity are 1 and 2; and the HARQ process identifiers in the fourth periodicity are 3 and 4, and so on.).

In step 2.1, the UE calculates the position information of resource available to itself according to the configuration information of the resources received in the step 1, and uses the resources at the position.

The available resource position at the beginning of each periodicity of the UE may be calculated through the following formula:

[(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity)modulo (1024×numberOfSlotsPerFrame×numberOfSymbolsPerSlot), where the numberOfSlotsPerFrame is a number of slots per frame, the numberOfSymbolsPerSlot is a number of symbols per slot, the SFN is a current system frame number, the slot number in the frame is a slot number in the current system frame, the timeDomainOffset is a resource offset relative to a time domain with SFN equalling to 0, S is a starting symbol number, $N$ is a resource number, and the periodicity is the SPS resource periodicity configured by the RRC message.

The information of the resources (including the starting position of the resources) available to the UE within each periodicity may be configured through at least one of the following manners.

In manner 1, the configuration is made through the resource allocation bitmap, for example, a 10-bit bitmap is used to indicate the position of available resources in 10 bits starting from the starting position.

In manner 2, the configuration is made through the resource allocation duration, for example, a resource allocation duration of 10 ms is used to indicate the resource of 10 ms starting from the starting position.

In manner 3, the configuration is made through the resource allocation duration and the resource allocation short periodicity, for example, the resource allocation duration of 10 ms and the resource allocation short periodicity of 2 ms are used to indicate that one resource is allocated every 2 ms in a 10-ms time starting from the starting position.

In step 2.2, the UE calculates available HARQ process identifiers within each periodicity according to the configuration information of the resources received in the step 1. In the present embodiment, the number of the available HARQ processes within each periodicity is multiple.

For example, the UE may calculate HARQ process identifiers (HARQ process ID) of the first resource within each periodicity through the following formula:

HARQ Process ID=[floor(CURRENT_slot×10/(numberOfSlotsPerFrame×periodicity))]modulo(nrofHARQ-Processes/nrofHARQ-ProcessesPerPeriod), where the CURRENT_slot is a current slot number, the numberOfSlotsPerFrame is the number of slots per frame, the periodicity is the SPS resource periodicity configured by the RRC message, the nrofHARQ-Processes is the number of HARQ processes of the SPS resource configured by the RRC message, and the nrofHARQ-ProcesssesPerPeriod is a number of HARQ processes that are available to the resources within each periodicity.

The HARQ process identifiers of subsequent resources of the UE within each periodicity are:

assigned in sequence within the remaining HARQ process IDs according to a periodicity number sequence and a resource number sequence. For example, the periodicity is equal to 10, the nrofHARQ-Processes is equal to 4, the nrofHARQ-ProcessPpersPeriod is equal to 2, and if the network side configures two resource positions per periodicity, then the HARQ process ID of the first resource in the first periodicity equals to 1, the HARQ process ID of the first resource in the second periodicity equals to 2, the HARQ process ID of the first resource in the third periodicity equals to 1, and the HARQ process ID of the first resource in the fourth periodicity equals to 2, and so on; the HARQ process ID of the second resource in the first periodicity equals to 3, the HARQ process ID of the second resource in the second periodicity equals to 4, the HARQ process ID of the second resource in the third periodicity equals to 3, and the HARQ process ID of the second resource in the fourth periodicity equals to 2, and so on.

In step 2.3, the UE detects whether a resource is available at sending positions for the plurality of resources within each periodicity; and if the resource is available, the UE sends data at the sending position of the available resource.

In some embodiments of the present disclosure, as shown in FIG. 3, the network side device sends configuration information of resources to the user equipment (UE) according to a preset periodicity, wherein the configuration information of the resources is configuration information of the UL configured grant Type 2 resources, and a HARQ process is available within each periodicity. The present embodiment includes the following steps.

In step 1, the network side device sends the configuration information of the UL configured grant Type 2 resources to the UE, and the configuration information of the resources includes one of the following or any combination of the following:

a periodicity of resources (e.g., periodicity, 40 ms), and allocation information of a plurality of resources within each periodicity;

wherein the allocation information of the plurality of resources within each periodicity includes one of the following or any combination the following:

a resource allocation bitmap (e.g., ten bits identify positions of ten slots, and for a bit with a value being 1, a resource at the position of the slot is considered as a resource allocated to the UE.);

a resource allocation duration (e.g., for a resource with a periodicity of 40 ms, it is a resource allocation duration of 10 ms from a starting position of the resource.);

and a resource allocation short periodicity (e.g., for a resource with a periodicity of 40 ms, there is a resource allocation duration of 10 ms in every 40 ms, and a periodicity of resource allocation in the 10 ms is 2 ms.).

Further, the network side device may further send available HARQ configuration information to the UE, or agree on HARQ configuration information available to the UE in advance through a protocol. The HARQ configuration information may include:

a number of HARQ processes of the resources (e.g., the total number of the HARQ processes that are available to the resources being four).

In step 2.1, according to the configuration information of the resources received in the step 1, when the network side device sends an activation signaling (e.g., a PDCCH activation command), the UE calculates the position information of resources available to itself according to position information of resources in the activation signaling, and uses the resources at the position;

wherein the position of the first available resource of the UE within each periodicity may be calculated through the following formula:

[(SFN×numberOfSlotsPerFrame×numberOfSymbolsPerSlot)+(slot number in the frame×numberOfSymbolsPerSlot)+symbol number in the slot]−[(SFNstart time×numberOfSlotsPerFrame×numberOfSymbolsPerSlot+slotstart time×numberOfSymbolsPerSlot+symbolstart time)+N×periodicity]modulo (1024×numberOfSlotsPerFrame×numberOfSymbolsPerSlot), where the numberOfSlotsPerFrame is a number of slots per frame, the numberOfSymbolsPerSlot is a number of symbols per slot, the SFN is a current system frame number, the slot number in the frame is a slot number in the current system frame, the SFNstart time is a starting system frame number, the slotstart time is a starting slot number, the symbolstart time is a starting symbol number, N is a resource number, and the periodicity is an SPS resource periodicity configured by an RRC message.

The information of the resources (including the starting position of the resources) available to the UE within each periodicity may be configured through at least one of the following manners.

In manner 1, the configuration is made through the resource allocation bitmap, for example, a 10-bit bitmap is used to indicate the position of available resources in 10 bits starting from the starting position.

In manner 2, the configuration is made through the resource allocation duration, for example, a resource allocation duration of 10 ms is used to indicate the resource of 10 ms starting from the starting position.

In manner 3, the configuration is made through the resource allocation duration and the resource allocation short periodicity, for example, the resource allocation duration of 10 ms and the resource allocation short periodicity of 2 ms are used to indicate that one resource is allocated every 2 ms in a 10-ms time starting from the starting position.

In Step 2.2, the UE calculates the HARQ process identifier available within each periodicity according to the configuration information of the resources received in the step 1. In the present embodiment, the number of the available HARQ process within each periodicity is one.

For example, the available HARQ process identifier (HARQ process ID) may be calculated through the following formula:

HARQ Process ID=[floor(CURRENT_slot×10/(numberOfSlotsPerFrame×periodicity))]modulo nrofHARQ-Processes.

where the CURRENT_slot is a current slot number, the numberOfSlotsPerFrame is the number of slots per frame, the periodicity is the SPS resource periodicity configured by the RRC message, and the nrofHARQ-Processes is a number of HARQ processes of the SPS resource configured by the RRC message.

In step 2.3, the UE detects whether a resource is available at sending positions for the plurality of resources within each periodicity; and if the resource is available, the UE sends data at the sending position of the available resource.

In the present embodiment, as shown in FIG. 3, the network side device sends configuration information of resources to the user equipment according to a preset periodicity, wherein the configuration information of the resources is configuration information of the UL configured grant Type 2 resources, and a plurality of HARQ processes are available within each periodicity. The present embodiment includes the following steps.

In step 1, the network side device sends the configuration information of the UL configured grant Type 2 resources to the UE, and the configuration information of the resources includes one of the following or any combination of the following:

a periodicity of resources (e.g., periodicity, 40 ms), and allocation information of a plurality of resources within each periodicity;

wherein the allocation information of the plurality of resources within each periodicity includes one of the following or any combination of the following:

a resource allocation bitmap (e.g., ten bits identify positions of ten slots, and for a bit with a value being 1, a resource at the position of the slot is considered as a resource allocated to the UE.);

a resource allocation duration (e.g., for a resource with a periodicity of 40 ms, it is a resource allocation duration of 10 ms from a starting position of the resource.);

and a resource allocation short periodicity (e.g., for a resource with a periodicity of 40 ms, there is a resource allocation duration of 10 ms in every 40 ms, and a periodicity of resource allocation in the 10 ms is 2 ms.).

Further, the network side device may further send available HARQ configuration information to the UE, or agree on HARQ configuration information available to the UE in advance through a protocol. The HARQ configuration information may include one of the following or any combination of the following:

a number of HARQ processes of the resources (e.g., the total number of HARQ processes that are available to the resources is four.);

HARQ process identifiers of resources (e.g., the HARQ process identifiers available to the resources in total are 1, 2, 3, and 4.);

a number of HARQ processes that are available to the resources within each periodicity (e.g., nrofHARQ-ProcessesPerPeriod, and two HARQ processes may be available within each periodicity.); or HARQ process identifiers that are available to the resources within each periodicity (e.g., there are four HARQ processes available to the UE in total, and two HARQ processes are available within each periodicity, then the HARQ process identifiers of the UE in the first periodicity starting from a starting activated position are 1 and 2; the HARQ process identifiers in the second periodicity are 3 and 4; the HARQ process identifiers in the third periodicity are 1 and 2; and the HARQ process identifiers in the fourth periodicity are 3 and 4, and so on.).

In step 2.1, according to the configuration information of the resources received in the step 1, when the network side device sends an activation signaling (e.g., a PDCCH activation command), the UE calculates position information of resources available to itself according to the position information of resources in the activation signaling, and uses the resources at the position.

The position of the first available resource of the UE within each periodicity may be calculated through the following formula:

[(SFN×numberOfSlotsPerFrame×numberOfSymbolsPerSlot)+(slot number in the frame×numberOfSymbolsPerSlot)+symbol number in the slot]−[(SFNstart time×numberOfSlotsPerFrame×numberOfSymbolsPerSlot+slotstart time×numberOfSymbolsPerSlot+symbolstart time)+N× periodicity]modulo (1024×
numberOfSlotsPerFrame×
numberOfSymbolsPerSlot), where the numberOfSlotsPerFrame is a number of slots per frame, the numberOfSymbolsPerSlot is a number of symbols per slot, the SFN is a current system frame number, the slot number in the frame is a slot number in the current system frame, the SFNstart time is a starting system frame number, the slotstart time is a starting slot number, the symbolstart time is a starting symbol number, $N$ is a resource number, and the periodicity is an SPS resource periodicity configured by an RRC message.

The information of the resources (including the starting position of the resources) available to the UE within each periodicity may be configured through at least one of the following manners.

In manner 1, the configuration is made through the resource allocation bitmap, for example, a 10-bit bitmap is used to indicate the position of available resources in 10 bits starting from the starting position.

In manner 2, the configuration is made through the resource allocation duration, for example, a resource allocation duration of 10 ms is used to indicate the resource of 10 ms starting from the starting position.

In manner 3, the configuration is made through the resource allocation duration and the resource allocation short periodicity, for example, the resource allocation duration of 10 ms and the resource allocation short periodicity of 2 ms are used to indicate that one resource is allocated every 2 ms in a 10-ms time starting from the starting position.

In step 2.2, the UE calculates available HARQ process identifiers within each periodicity according to the configuration information of the resources received in the step 1. In the present embodiment, the number of the available HARQ processes within each periodicity is multiple.

For example, available HARQ process identifiers (HARQ process IDs) of the starting resource of each periodicity may be calculated through the following formula:

HARQ Process ID=[floor(CURRENT_slot×10/(numberOfSlotsPerFrame×periodicity))]modulo nrof-HARQ-Processes, where the CURRENT_slot is a current slot number, the numberOfSlotsPerFrame is the number of slots per frame, the periodicity is the SPS resource periodicity configured by the RRC message, and the nrofHARQ-Processes is a number of HARQ processes of the SPS resource configured by the RRC message.

The HARQ process identifiers of subsequent resources of the UE within each periodicity are:
assigned in sequence within the remaining HARQ process numbers according to a periodicity number sequence and a resource number sequence. For example, the periodicity is equal to 10, the nrofHARQ-Processes is equal to 4, the nrofHARQ-ProcesssesPerPeriod is equal to 2, and if the network side device configures two resource positions per periodicity, then the HARQ process ID of the first resource in the first periodicity equals to 1, the HARQ process ID of the first resource in the second periodicity equals to 2, the HARQ process ID of the first resource in the third periodicity equals to 1, and the HARQ process ID of the first resource in the fourth periodicity equals to 2, and so on; the HARQ process ID of the second resource in the first periodicity equals to 3, the HARQ process ID of the second resource in the second periodicity equals to 4; the HARQ process ID of the second resource in the third periodicity equals to 3, and the HARQ process ID of the second resource in the fourth periodicity equals to 2, and so on.

In step 2.3, the UE detects whether a resource is available at sending positions for the plurality of resources within each periodicity; and if the resource is available, the UE sends data at the sending position of the available resource.

In some embodiments of the present disclosure, as shown in FIG. 3, the network side device sends configuration information of resources to the user equipment according to a preset periodicity, wherein the configuration information of the resources is configuration information of the AUL resources. The present embodiment includes the following steps.

In step 1, the network side device sends the configuration information of the UL configured grant Type 1 resources to the UE, and the configuration information of the resources includes one of the following or any combination of the following:
  a periodicity of resources (e.g., periodicity, 40 ms),
  and allocation information of a plurality of resources within each periodicity;
  wherein the allocation information of the plurality of resources within each periodicity includes one of the following or any combination of the following:
  a resource allocation bitmap (e.g., ten bits identify positions of ten slots, and for a bit with a value being 1, a resource at the position of the slot is considered as a resource allocated to the UE.);
  a resource allocation duration (e.g., for a resource with a periodicity of 40 ms, it is a resource allocation duration of 10 ms from a starting position of the resource.);
  and a resource allocation short periodicity (e.g., for a resource with a periodicity of 40 ms, there is a resource allocation duration of 10 ms in every 40 ms, and a periodicity of resource allocation in the 10 ms is 2 ms.).

Further, the network side device may further send available HARQ configuration information to the UE, or agree on HARQ configuration information available to the UE in advance through a protocol. The HARQ configuration information may include:
  a HARQ process ID pool available to the UE (e.g., HARQ process identifiers available to the UE are 1, 2, 3, and 4.).

In step 2.1, according to the configuration information of the resources received in the step 1, when the network side device sends an activation signaling (e.g., a PDCCH activation command), the UE calculates position information of resources available to itself according to position information of the resources in the activation signaling, and uses the resources at the position.

The position of the first available resource of the UE within each periodicity may be calculated through the following formula:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+$N$×periodicity]modulo (1024×numberOfSlotsPerFrame×numberOfSymbolsPerSlot), where the numberOfSlotsPerFrame is a number of slots per frame, the numberOfSymbolsPerSlot is a number of symbols per slot, the SFN is a current system frame number, the slot number in the frame is a slot number in the current system frame, the SFNstart time is a starting system frame number, the slotstart time is a starting slot number, the symbolstart time is a starting symbol number, N is a resource number, and the periodicity is an SPS resource periodicity configured by an RRC message.

The information of the resources (including the starting position of the resources) available to the UE within each periodicity may be configured through at least one of the following manners.

In manner 1, the configuration is made through the resource allocation bitmap, for example, a 10-bit bitmap is used to indicate the position of available resource in 10 bits starting from the starting position.

In manner 2, the configuration is made through the resource allocation duration, for example, a resource allocation duration of 10 ms is used to indicate the resource of 10 ms starting from the starting position.

In manner 3, the configuration is made through the resource allocation duration and the resource allocation short periodicity, for example, the resource allocation duration of 10 ms and the resource allocation short periodicity of 2 ms are used to indicate that one resource is allocated every 2 ms in a 10-ms time starting from the starting position.

In step 2.2, the UE detects whether a resource is available at sending positions for the plurality of resources within each periodicity; and if the resource is available, the UE sends data at the sending position of the available resource, and selects one HARQ process (e.g., selects HARQ process 1) according to the configuration information of the resources in the step 1.

In the above embodiments 1 to 7, when the network side device configures the UE with the semi-persistent resource, for each resource periodicity, the network side device may configure a plurality of resource positions within a periodicity of time. In addition, when a data sending terminal has data to send, the data sending terminal monitors whether the resources are available at the plurality of resource positions, and sends the data if the resources are available.

Figure 4:
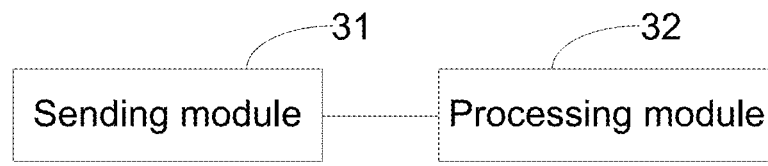
FIG. 4 is a block diagram of a structure of a network side device, in accordance with some embodiments of the present disclosure.

The embodiments of the present disclosure also provide a network side device. As shown in FIG. 4, the network side device includes:

a sending module 31 used to send configuration information of resources to the user equipment, wherein the configuration information of the resources includes at least one of the following: a periodicity of the resources, or allocation information of a plurality of resources within each periodicity.

In the present embodiment, the network side device sends configuration information of the plurality of resources within each periodicity to the user equipment, so that the network side device and/or the user equipment may obtain allocation information of the plurality of resources within each sending periodicity, and further send data according to the allocation information of the plurality of resources. In this way, the time delay of the data transmission is reduced.

Further, the configuration information of the resources further includes HARQ configuration information of the resources.

Further, the configuration information of the resources is configuration information of DL SPS resources, or configuration information of UL configured grant Type 2 resources, or configuration information of AUL resources.

Further, the configuration information of the resources is configuration information of UL configured grant Type 1 resources, and the configuration information of the resources further includes at least one of the following:

a time domain offset, or
a time domain length occupied by each time domain resource.

Further, the allocation information of the plurality of resources within each periodicity includes at least one of the following:

starting position information of resource allocation;
a resource allocation bitmap indicating corresponding available resource, starting from a starting position of the resources in n bits, wherein n is a positive integer;
a resource allocation duration indicating a duration of existing available resources starting from the starting position of the resources; or
a resource allocation short periodicity indicating a periodicity of each available resource in a second predetermined time starting from the starting position.

Further, the HARQ configuration information of the resources includes at least one of the following:

a number of HARQ processes of the resources;
HARQ process IDs of the resources;
a number of HARQ processes that are available to the resources within each periodicity; or
HARQ process identifiers that are available to the resources within each periodicity;

Further, the configuration information of the resources is the configuration information of the DL SPS resources, the network side device further includes:

a processing module 32 used to detect whether a resource is available at sending positions for the plurality of resources within each periodicity, and to send data at the sending position of the available resource if the resource is available.

Figure 5:
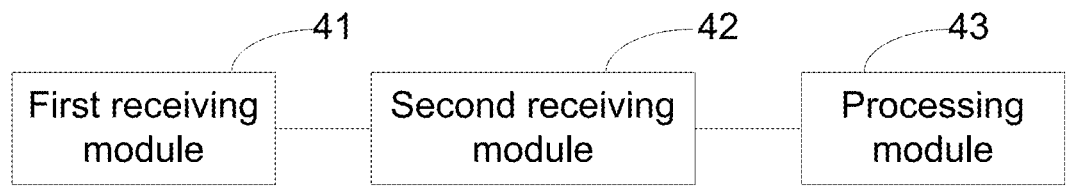
FIG. 5 is a block diagram of a structure of a user equipment, in accordance with some embodiments of the present disclosure.

The embodiments of the present disclosure further provide a user equipment. As shown in FIG. 5, the user equipment includes:

a first receiving module 41 used to receive configuration information of resources from a network side device, wherein the configuration information of the resources includes at least one of the following: a periodicity of the resources, or allocation information of a plurality of resources within each periodicity;
a second receiving module 42 used to receive an activation signaling from the network side device; or
a processing module 43 used to determine available resources according to position information of resources in the activation signaling and the configuration information of the resources.

In the present embodiment, the network side device sends configuration information of the plurality of resources within each periodicity to the user equipment, so that the network side device and/or the user equipment may obtain allocation information of the plurality of resources within each sending periodicity, and further send data according to the allocation information of the plurality of resources. In this way, the time delay of the data transmission is reduced.

Further, the processing module 43 is further used to calculate the HARQ process IDs available within each periodicity according to the configuration information of the resources.

Further, the configuration information of the resources is configuration information of DL SPS resources, or configuration information of UL configured grant Type 2 resources, or configuration information of AUL resources.

Further, the configuration information of the resources is configuration information of UL configured grant Type 1 resources, and the configuration information of the resources further includes at least one of the following:

a time domain offset; or a time domain length occupied by each time domain resource.

Further, the allocation information of the plurality of resources within each periodicity includes at least one of the following:

starting position information of resource allocation;

a resource allocation bitmap indicating corresponding available resource, starting from a starting position of the resources in n bits, wherein n is a positive integer;

a resource allocation duration indicating a duration of the existence of available resources starting from the starting position of the resources; or a resource allocation short periodicity indicating a periodicity of each available resource in a second predetermined time starting from the starting position.

Further, the HARQ configuration information of the resources includes at least one of the following:

a number of HARQ processes of the resources;

HARQ process identifiers of the resources;

a number of HARQ processes that are available to the resources within each periodicity; or HARQ process identifiers that are available to the resources within each periodicity.

Further, the configuration information of the resources is the configuration information of the DL SPS resources, or the configuration information of the UL configured grant Type 1 resources, or the configuration information of the UL configured grant Type 2 resources. In a case where the number of available HARQ processes within each periodicity is multiple, the processing module 43 is used to assign identifier(s) to the HARQ processes of the resources within each periodicity according to a periodicity number sequence and a resource number sequence within each periodicity.

Further, the configuration information of the resources is the configuration information of the UL configured grant Type 1 resources, or the configuration information of the UL configured grant Type2 resources, or the configuration information of the AUL resources. The processing module 43 is further used to detect whether a resource is available at sending positions for the plurality of resources within each periodicity, and to send data at the sending position of the available resource if the resource is available.

The embodiments of the present disclosure further provide a network side device. The network side device includes a memory, a processor, and a computer program that is stored in the memory and may be executed on the processor. The computer program, when executed by the processor, implements steps in the resource allocation method as described above.

Figure 6:
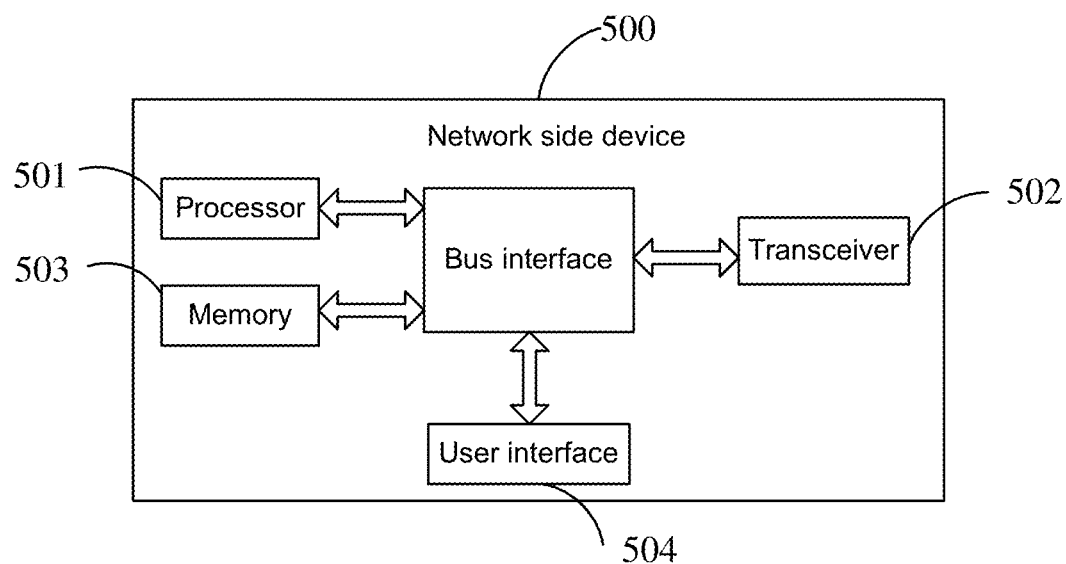
FIG. 6 is a schematic diagram showing components of a network side device, in accordance with some embodiments of the present disclosure.

Referring to FIG. 6, FIG. 6 is a structural diagram of a network side device applied in the embodiments of the present disclosure, which can implement details of the resource allocation method in the foregoing embodiments and achieve same effects. As shown in FIG. 6, the network side device 500 includes: a processor 501, a transceiver 502, a memory 503, a user interface 504, and a bus interface.

In the embodiments of the present disclosure, the network side device 500 further includes: a computer program that is stored in the memory 503 and may be executed on the processor 501. The computer program, when executed by the processor 501, implements the following steps: sending configuration information of resources to a user equipment, wherein the configuration information of the resources includes at least one of the following: a periodicity of the resources, or allocation information of a plurality of resources within each periodicity.

In FIG. 6, a bus architecture may include any number of interconnected buses and bridges that may be connected through one or more processors represented by the processor 501 and various circuits of a memory represented by the memory 503. The bus architecture may also connect other various circuits such as peripherals, voltage regulators, power management circuits, which is well known in the art, and therefore, will not be described further herein. The bus interface provides an interface. The transceiver 502 may be a plurality of components. That is, the transceiver 502 includes a transmitter and a receiver that provide units to communicate with other various apparatuses over a transmission medium. For different user equipment, the user interface 504 may also be an interface capable of connecting with a required device internally or externally. And the device connected to the user interface 504 includes, but is not limited to a keypad, a display, a speaker, a microphone, and an operating lever.

The processor 501 is responsible for managing the bus architecture and general processing, and the memory 503 may store data used by the processor 501 when performing operations.

Further, the configuration information of the resources further includes HARQ configuration information of the resources.

Further, the configuration information of the resources is configuration information of DL SPS resources, or configuration information of UL configured grant Type 2 resources, or configuration information of AUL resources.

Further, the configuration information of the resources is configuration information of UL configured grant Type 1 resources, and the configuration information of the resources further includes at least one of the following:

a time domain offset; or a time domain length occupied by each time domain resource.

Further, the allocation information of the plurality of resources within each periodicity includes at least one of the following:

starting position information of resource allocation;

a resource allocation bitmap indicating positions of available resources in n bits starting from a starting position of the resources, and n being a positive integer;

a resource allocation duration indicating a duration of the existence of available resources starting from the starting position of the resources; or a resource allocation short periodicity indicating a periodicity of each available resource in a second predetermined time starting from the starting position.

Further, the HARQ configuration information of the resources includes at least one of the following:

a number of HARQ processes of the resources;

HARQ process identifiers of the resources;

a number of HARQ processes that are available to the resources within each periodicity; or HARQ process identifiers that are available to the resources within each periodicity;

Further, in a case where the configuration information of the resources is the configuration information of the DL SPS resources, the computer program, when executed by the processor 501, implements the following steps: detecting whether a resource is available at sending positions for the plurality of resources within each periodicity, and if the resources is available, sending data at a sending position of the available resource.

The embodiments of the present disclosure further provide a user equipment. The user equipment includes a memory, a processor, and a computer program that is stored in the memory and may be executed on the processor. The computer program, when executed by the processor, implements steps in the resource usage method as described above.

Figure 7:
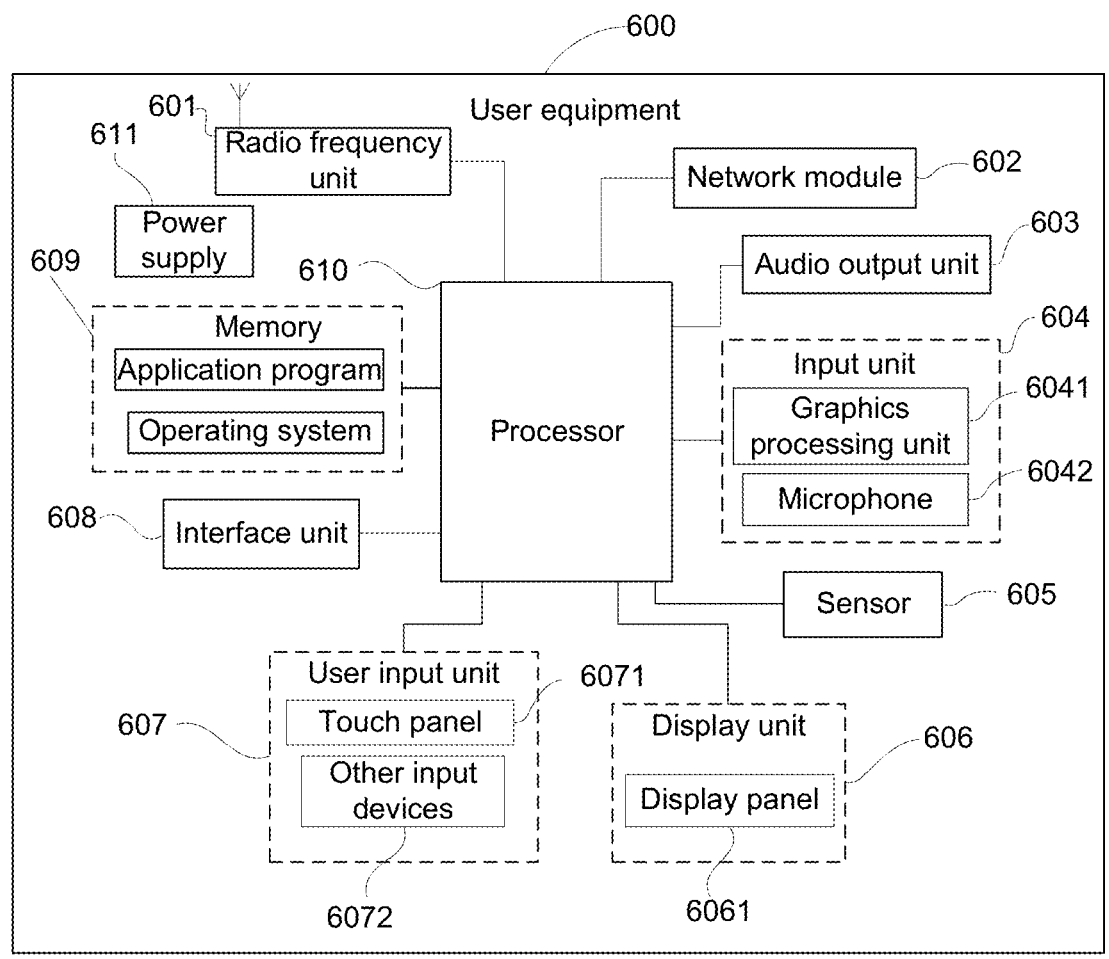
FIG. 7 is a schematic diagram showing components of a user equipment, in accordance with some embodiments of the present disclosure.

FIG. 7 is a schematic diagram showing a hardware structure of the user equipment that implements the embodiments of the present disclosure. Referring to FIG. 7, the user equipment 600 includes, but is not limited to, components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art will understand that the structure of the user equipment shown in FIG. 7 does not constitute a limitation to the user equipment, and the user equipment may include more or fewer components than the user equipment shown in the figure, or may combine certain components, or may have a different arrangement of components. In the embodiments of the present disclosure, the user equipment includes, but is not limited to, a mobile phone, a tablet computer, a notebook computer, a palmtop computer, a vehicle-mounted device, a wearable device, or a pedometer.

The processor 610 is used to receive configuration information of resources from a network side device, wherein the configuration information of the resources includes at least one of the following: a periodicity of the resources, or allocation information of a plurality of resources within each periodicity; and to receive an activation signaling from the network side device, and to determine available resources according to position information of resources in the activation signaling and the configuration information of the resources.

Further, in a case where the configuration information of the resources further includes HARQ configuration information of the resources, the processor 610 is further used to calculate available HARQ process identifier(s) within each periodicity according to the configuration information of the resources.

Further, the configuration information of the resources is configuration information of DL SPS resources, or configuration information of UL configured grant Type 2 resources, or configuration information of AUL resources.

Further, the configuration information of the resources is configuration information of UL configured grant Type 1 resources, and the configuration information of the resources further includes at least one of the following:
 a time domain offset; or
 a time domain length occupied by each time domain resource.

Further, the allocation information of the plurality of resources within each periodicity includes at least one of the following:
 starting position information of resource allocation;
 a resource allocation bitmap indicating corresponding available resource, starting from a starting position of the resources in n bits, wherein n is a positive integer;
 a resource allocation duration indicating a duration of the existence of available resources starting from the starting position of the resources; or
 a resource allocation short periodicity indicating a periodicity of each available resource in a second predetermined time starting from the starting position.

Further, the HARQ configuration information of the resources includes at least one of the following:
 a number of HARQ processes of the resources;
 HARQ process identifiers of the resources;
 a number of HARQ processes that are available to the resources within each periodicity; or
 HARQ process identifiers that are available to the resources within each periodicity;

Further, the configuration information of the resource is the configuration information of the DL SPS resources, or the configuration information of the UL configured grant Type 1 resources, or the configuration information of the UL configured grant Type 2 resources. In a case where the number of available HARQ processes within each periodicity is multiple, the processor 610 is further used to assign identifier(s) to the available HARQ processes of the resources within each periodicity according to a periodicity number sequence and a resource number sequence within each periodicity.

Further, the configuration information of the resources is the configuration information of the UL configured grant Type 1 resources, or the configuration information of the UL configured grant Type 2 resources, or the configuration information of the AUL resources. The processor 610 is further used to detect whether a resource is available at sending positions for the plurality of resources within each periodicity, and to send data at the sending position of the available resource if the resource is available.

It will be understood that, in the embodiments of the present disclosure, the radio frequency unit 601 may be used to receive and send signals during a process of receiving and sending information or a call. For example, after receiving downlink data from a base station, the radio frequency unit 601 then transmits the downlink data to the processor 610 to process. In addition, the radio frequency unit 601 sends uplink data to the base station. Generally, the radio frequency unit 601 includes, but is not limited to, an antenna, at least one amplifier, a transceiver, a coupler, a low noise amplifier, and a duplexer. In addition, the radio frequency unit 601 may also communicate with a network and other devices through a wireless communication system.

The user equipment provides a user with wireless broadband access to the Internet through the network module 602, such as helping the user receive and send emails, browse web pages, and access streaming media.

The audio output unit 603 may convert audio data that is received by the radio frequency unit 601 or the network module 602 or that is stored in the memory 609 into audio signals and output the audio signals as sound. Moreover, the audio output unit 603 may also provide audio output related to a specific function performed by the user equipment 600 (e.g., a call signal reception sound, and a message reception sound). The audio output unit 603 includes a speaker, a buzzer, and a receiver.

The input unit 604 is used to receive audio or video signals. The input unit 604 may include a graphics processing unit (GPU) 6041 and a microphone 6042. The GPU 6041 processes image data of static pictures or videos obtained by an image capture device (e.g., a camera) in a video capture mode or an image capture mode. Processed image frames may be displayed on the display unit 606. The image frames processed by the GPU 6041 may be stored in the memory 609 (or other storage media) or sent via the radio frequency unit 601 or the network module 602. The microphone 6042 may receive sound, and can process such sound into audio data. The processed audio data may be converted into a format that allows the processed audio data may be sent to a mobile communication base station via the radio frequency unit 601 in a telephone call mode.

The user equipment 600 further includes at least one sensor 605, such as a light sensor, a motion sensor and other sensors. For example, the light sensor includes an ambient light sensor and a proximity sensor. The ambient light sensor may adjust a brightness of a display panel 6061 according to a brightness of the ambient light. The proximity sensor may turn off the display panel 6061 and/or backlight when the user equipment 600 is moved near an ear. As a type of motion sensor, an accelerometer sensor may detect a magnitude of acceleration in all directions (generally three axes), may detect a magnitude and a direction of gravity when the accelerometer sensor is stationary, and may be used to identify an attitude of the user equipment (e.g., switching between a horizontal screen and a vertical screen, related games, and magnetometer attitude calibration), vibration recognition related functions (e.g., pedometer and tapping), etc. The sensor 605 may further include a fingerprint sensor, a pressure sensor, an iris sensor, a molecular sensor, a gyroscope, a barometer, a hygrometer, a thermometer and an infrared sensor, which will not be described in detail here.

The display unit 606 is used to display information input by the user or information provided to the user. The display unit 606 may include the display panel 6061 that may be configured in a form of a liquid crystal display (LCD), an organic light-emitting diode (OLED), or the like.

The user input unit 607 may be used to receive input numerical or character information and generate a key input signal related to user setting and function control of the user equipment. For example, the user input unit 607 includes a touch panel 6071 and other input devices 6072. The touch panel 6071, also known as a touch screen, may collect the users touch operations (e.g., the users operations on or near the touch panel 6071 by using any suitable object or accessory such as a finger and a touch pen) on or near the touch panel 6071. The touch panel 6071 may include two parts, i.e., a touch detection device and a touch controller. The touch detection device detects the users touch position, detects a signal generated by the touch operation, and transmits the signal to the touch controller. The touch controller receives touch information from the touch detection device, converts the touch information into coordinates of a touch point, sends the coordinates of the touch point to the processor 610, and receives and executes a command sent by the processor 610. In addition, the touch panel 6071 may be implemented by using various types of touch panels such as a resistive touch panel, a capacitive touch panel, an infrared touch panel, or a surface acoustic wave touch panel. In addition to the touch panel 6071, the user input unit 607 may also include other input devices 6072. For example, the other input devices 6072 may include, but be not limited to, a physical keyboard, function keys (e.g., volume control keys, and a switch key, etc.), a trackball, a mouse and an operating lever, which will not be described in detail here.

Further, the touch panel 6071 may cover the display panel 6061. After the touch panel 6071 detects a touch operation on or near it, the touch panel 6071 transmits the touch operation to the processor 610 to determine a type of a touch event, and then the processor 610 provides a corresponding visual output on the display panel 5061 according to the type of the touch event. Although in FIG. 7, the touch panel 6071 and the display panel 6061 are used as two separate components to implement input and output functions of the user equipment, in some embodiments, the touch panel 6071 and the display panel 6061 may be integrated to implement the input and output functions of the user equipment, which is not specifically limited herein.

The interface unit 608 is an interface for connecting an external device and the user equipment 600. For example, the external device may include a wired or wireless headset port, an external power supply (or battery charger) port, a wired or wireless data port, a memory card port, a port for connecting a device with an identification module, an audio input/output (I/O) port, a video I/O port, and an earphone port. The interface unit 608 may be used to receive input (e.g., data information or power) from the external device and transmit the received input to one or more elements in the user equipment 600, or may be used to transmit data between the user equipment 600 and the external device.

The memory 609 may be used to store software programs and various data. The memory 609 may mainly include a program storage region and a data storage region. The program storage region may store an operating system and at least one application program required by functions (e.g., a sound playing function and an image playing function). The data storage region may store data created according to use of a mobile phone (e.g., audio data and a phone book). In addition, the memory 609 may include a high-speed random access memory, and may further include a non-volatile memory, such as at least one magnetic disk storage device, a flash memory device, or other volatile solid-state storage devices.

The processor 610 is a control center of the user equipment, connects all parts of the entire user equipment using various interfaces and lines, and performs various functions of the user equipment and processes data by running or executing software programs and/or modules stored in the memory 609 and invoking data stored in the memory 609, thereby performing overall monitoring to the user equipment. The processor 610 may include one or more processing units. Optionally, an application processor and a modem processor may be integrated into the processor 610. The application processor mainly deals with operating systems, user interfaces and application programs, and the modem processor mainly deals with wireless communication. It will be understood that the modem processor may not be integrated into the processor 610.

The user equipment 600 may further include the power supply 611 (e.g., a battery) to supply power to all components. Optionally, the power supply 611 may be logically connected to the processor 610 through a power management system, so as to realize charging management, discharging management, power consumption management, and other functions through the power management system.

In addition, the user equipment 600 includes some functional modules that are not shown, which will not be described in detail here.

The embodiments of the present disclosure further provide a non-transitory computer-readable storage medium. The non-transitory computer-readable storage medium stores thereon a computer program that, when executed by a processor, implements steps in the resource allocation method as described above, or steps in the resource usage method as described above.

It will be understood that, the embodiments described herein may be implemented using hardware, software, firmware, middleware, microcode, or a combination thereof. For a hardware implementation, the processing unit may be implemented in one or more application specific integrated circuits (ASICs), digital signal processors (DSPs), digital signal processing devices (DSPDs), programmable logic devices (PLDs), field programmable gate arrays (FPGAs), general purpose processors, controllers, micro-controllers, microprocessors, and other electronic units for performing the functions described herein, or a combination thereof.

For a software implementation, the techniques described herein may be implemented with modules (e.g., procedures, functions, etc.) that perform the functions described herein. Software codes may be stored in a memory and executed by a processor. The memory may be inside the processor or external to the processor.

Whether these functions are implemented in hardware or software depends on particular applications and design constraints of the technical solutions. Those skilled in the art may use different methods to realize the described functions for each particular application, but such implementation should not be regarded as going beyond the scope of the present disclosure.

It will be clearly understood by those skilled in the art that, for convenience and simplicity of the description, specific working processes of the systems, apparatuses and units described above may refer to the corresponding processes in the foregoing method embodiments, and are not described herein again.

Various embodiments in the present description are all described in a progressive manner. Each embodiment focuses on differences from other embodiments. As for the same or similar parts between the various embodiments, reference may be made to each other.

Those skilled in the art will understand that, embodiments of the present disclosure may be provided as methods, apparatuses, or computer program products. Therefore, the embodiments of the present disclosure may be in a form of complete hardware embodiments, complete software embodiments or embodiments combining software and hardware. Furthermore, the embodiments of the present disclosure may take a form of a computer program product embodied on one or more computer-usable storage media (including, but not limited to, disk storage, compact disc read-only memory (CD-ROM), and optical storage) including computer-usable program codes therein.

In the embodiments provided in the present application, it will be understood that the disclosed apparatuses and methods may be implemented in other ways. For example, the apparatus embodiments described above are merely illustrative, and for example, the division of the units is only one type of logical functional division, and other divisions may be realized in practical implementation. For example, a plurality of units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

The units described as separate parts may be or may not be physically separate, and parts displayed as units may be or may not be physical units, i.e., may be located in one position, or may be distributed on a plurality of network units. Some or all of the units may be selected according to actual needs to achieve the purpose of the solutions of the embodiments.

The functions may be stored in a computer-readable storage medium if they are implemented in the form of software functional units and sold or used as separate products. Based on such understanding, essence of the technical solutions of the present disclosure, or a part of the technical solutions that makes a contribution to the prior art, or parts of the technical solutions may be embodied in a form of a software product. The computer software product is stored in a storage medium and includes several instructions for causing a computer device (which may be a personal computer, a server, or a network device) to execute all or part of the steps in the methods described in the embodiments of the present disclosure. The aforementioned storage medium includes various media capable of storing program codes such as a U disk, a removable hard disk, a ROM, a RAM, a magnetic disk or an optical disk.

It will be understood by a person of ordinary skill in the art that all or part of the processes of the methods of the embodiments described above may be completed by controlling related hardware through a computer program, wherein the computer program may be stored in a computer-readable storage medium, and when executed, the computer program may include the processes of the embodiments of the methods described above. The storage medium may be a magnetic disk, an optical disk, a read-only memory (ROM), a random access memory (RAM), or the like.

The embodiments of the present disclosure are described with reference to flow diagrams and/or block diagrams of methods, the user equipment (systems), and computer program products according to the embodiments of the present disclosure. It will be understood that, each process and/or block of the flow diagrams and/or block diagrams, and combinations of processes and/or blocks of the flow diagrams and/or block diagrams may be implemented by computer program instructions. These computer program instructions may be provided to a processor of a general purpose computer, a special purpose computer, an embedded processor, or other user equipments with programmable data processing to produce a machine, so that the instructions are executed by the processor of the computer or other user equipments with programmable data processing to generate an apparatus for implementing the functions specified in one or more processes of the flow diagrams and/or one or more blocks of the block diagrams.

These computer program instructions may also be stored in a computer-readable memory that can guide the computer or other user equipments with programmable data processing to work in a particular manner, so that the instructions stored in the computer-readable memory produce a manufacture including an instruction apparatus which implements the functions specified in one or more processes of the flow diagrams and/or one or more blocks of the block diagrams.

These computer program instructions may also be loaded onto the computer or other user equipments with programmable data processing to cause a series of operational steps to be performed on the computer or other programmable user equipments to produce a process to be achieved by the computer, so that the instructions executed on the computer or other programmable user equipments provide steps for implementing the functions specified in one or more processes of the flow diagrams and/or one or more blocks of the block diagrams.

Although alternative embodiments of the disclosed embodiments have been described, additional variations and modifications of these embodiments may be made by those skilled in the art once they understand the basic inventive concepts. It is therefore intended that the following claims be interpreted to embrace alternative embodiments and all such variations and modifications falling within the scope of the embodiments of the present disclosure.

It will be further noted that, relational terms such as first and second herein are used only to distinguish one entity or action from another entity or action without necessarily requiring or implying any actual relationship or order between such entities or actions. Also, the term "comprise" or any other variations thereof is intended to cover non-exclusive inclusion, so that a process, method, article, or user equipment including a series of elements includes not only those elements but also other elements not explicitly listed or inherent to such process, method, article, or user equipment. Without further limitation, an element defined by the phrase "comprising a/an . . . " does not exclude the presence of other identical elements in the process, method, article, or user equipment comprising the element.

While the foregoing descriptions are alternative implementation manners of the present disclosure, and it will be noted that for a person of ordinary skill in the art, various improvements and embellishments may be made without departing from the principles set forth in the present disclosure and shall also be within the protection scope of the present disclosure.

What is claimed is:

1. A resource allocation method applied to a network side device, the resource allocation method comprising:
   sending configuration information of resources to a user equipment, wherein the configuration information of the resources includes at least one of the following: a periodicity of the resources, or allocation information of a plurality of resources within each periodicity, the resources are unlicensed band resources, and the configuration information of the resources is used for a determination of available resources in the plurality of resources within each periodicity;
   wherein the configuration information of the resources includes configuration information of downlink (DL) semi-persistent scheduling (SPS) resources, or configuration information of autonomous uplink (AUL) resources; and
   wherein in a case where the configuration information of the resources is the configuration information of the DL SPS resources, the method further comprises:
   detecting whether a resource is available at sending positions for the plurality of resources within each periodicity and, if the resource is available, sending data at a sending position of the available resource.

2. The resource allocation method according to claim 1, wherein the configuration information of the resources further includes hybrid automatic repeat request (HARD) configuration information of the resources.

3. The resource allocation method according to claim 2, wherein the HARQ configuration information of the resources includes at least one of the following:
   a number of HARQ processes of the resources;
   HARQ process identifier(s) of the resources;
   a number of HARQ process(es) available to the resources within each periodicity; or
   HARQ process identifier(s) available to the resources within each periodicity.

4. The resource allocation method according to claim 1, wherein the configuration information of the resources further includes configuration information of uplink (UL) configured grant Type 2 resources.

5. The resource allocation method according to claim 1, wherein the configuration information of the resources further includes configuration information of uplink (UL) configured grant Type 1 resources, and the configuration information of the resources further includes at least one of the following:
   a time domain offset; or
   a time domain length occupied by each time domain resource.

6. The resource allocation method according to claim 1, wherein the allocation information of the plurality of resources within each periodicity includes at least one of the following:
   starting position information of resource allocation;
   a resource allocation bitmap indicating corresponding available resource, starting from a starting position of the resources in n bits, wherein n is a positive integer;
   a resource allocation duration indicating a duration of existence of available resources starting from the starting position of the resources; or
   a resource allocation short periodicity indicating a periodicity of each available resource in a second predetermined time starting from the starting position.

7. A resource usage method applied to a user equipment, the resource usage method comprising:
   receiving configuration information of resources from a network side device, wherein the configuration information of the resources includes at least one of the following: a periodicity of the resources, or allocation information of a plurality of resources within each periodicity, the resources are unlicensed band resources, and the configuration information of the resources is used for a determination of available resources in the plurality of resources within each periodicity; and
   receiving an activation signaling from the network side device, and determining available resources according to position information of resources in the activation signaling and the configuration information of the resources;
   wherein in a case where the configuration information of the resources includes configuration information of uplink (UL) configured grant Type 1 resources, or configuration information of uplink (UL) configured grant Type 2 resources, or configuration information of autonomous uplink (AUL) resources, the method further comprises:
   detecting whether a resource is available at sending positions for the plurality of resources within each periodicity and, if the resource is available, sending data at a sending position of the available resource.

8. The resource usage method according to claim 7, wherein in a case where the configuration information of the resources further includes hybrid automatic repeat request (HARQ) configuration information of the resources, the resource usage method further comprises:
   calculating available HARQ process identifier(s) within each periodicity according to the configuration information of the resources.

9. The resource usage method according to claim 8, wherein the configuration information of the resources includes configuration information of downlink (DL) semi-persistent scheduling (SPS) resources.

10. The resource usage method according to claim 8, wherein the configuration information of the resources includes the configuration information of the uplink (UL) configured grant Type 1 resources, and the configuration information of the resources further includes at least one of the following:
    a time domain offset; or
    a time domain length occupied by each time domain resource.

11. The resource usage method according to claim 8, wherein the HARQ configuration information of the resources includes at least one of the following:
    a number of HARQ processes of the resources;

HARQ process identifier(s) of the resources;
a number of HARQ process(es) available to the resources within each periodicity; or
HARQ process identifier(s) available to the resources within each periodicity.

12. The resource usage method according to claim 7, wherein the allocation information of the plurality of resources within each periodicity includes at least one of the following:
   starting position information of resource allocation;
   a resource allocation bitmap indicating corresponding available resource, starting from a starting position of the resources in n bits, wherein n is a positive integer;
   a resource allocation duration indicating a duration of existence of available resources starting from the starting position of the resources; or
   a resource allocation short periodicity indicating a periodicity of each available resource in a second predetermined time starting from the starting position.

13. The resource usage method according to claim 7, wherein the configuration information of the resources includes configuration information of downlink (DL) semi-persistent scheduling (SPS) resources, or the configuration information of uplink (UL) configured grant Type 1 resources, or the configuration information of the UL configured grant Type 2 resources; and in a case where a number of HARQ processes available within each periodicity is multiple, the calculating available HARQ process identifier(s) within each periodicity according to the configuration information of the resources includes:
   assigning identifier(s) to the HARQ processes of the resources within each periodicity according to a periodicity number sequence and a resource number sequence within each periodicity.

14. A network side device, comprising a memory, a processor, and a computer program stored in the memory and executed on the processor; wherein the computer program, when executed by the processor, implements steps in the resource allocation method according to claim 1.

15. A user equipment, comprising a memory, a processor, and a computer program stored in the memory and executed on the processor; wherein the computer program, when executed by the processor, causes the user equipment to perform following steps:
   receiving configuration information of resources from a network side device, wherein the configuration information of the resources includes at least one of the following: a periodicity of the resources, or allocation information of a plurality of resources within each periodicity, the resources are unlicensed band resources, and the configuration information of the resources is used for a determination of available resources in the plurality of resources within each periodicity; and
   receiving an activation signaling from the network side device, and determining available resources according to position information of resources in the activation signaling and the configuration information of the resources;
   wherein in a case where the configuration information of the resources includes configuration information of uplink (UL) configured grant Type 1 resources, or configuration information of uplink (UL) configured grant Type 2 resources, or configuration information of autonomous uplink (AUL) resources, the computer program, when executed by the processor, further causes the user equipment to perform following steps:
   detecting whether a resource is available at sending positions for the plurality of resources within each periodicity and, if the resource is available, sending data at a sending position of the available resource.

16. The user equipment according to claim 15, wherein the configuration information of the resources further includes hybrid automatic repeat request (HARQ) configuration information of the resources, the user equipment is also used to:
   calculate available HARQ process identifier(s) within each periodicity according to the configuration information of the resources.

17. The user equipment according to claim 15, wherein the allocation information of the plurality of resources within each periodicity includes at least one of the following:
   starting position information of resource allocation;
   a resource allocation bitmap indicating corresponding available resource, starting from a starting position of the resources in n bits, wherein n is a positive integer;
   a resource allocation duration indicating a duration of existence of available resources starting from the starting position of the resources; or
   a resource allocation short periodicity indicating a periodicity of each available resource in a second predetermined time starting from the starting position.

18. The user equipment according to claim 15, wherein the HARQ configuration information of the resources includes at least one of the following:
   a number of HARQ processes of the resources;
   HARQ process identifier(s) of the resources;
   a number of HARQ process(es) available to the resources within each periodicity; or
   HARQ process identifier(s) available to the resources within each periodicity.

* * * * *